(12) United States Patent
Hawkins

(10) Patent No.: US 7,007,234 B2
(45) Date of Patent: Feb. 28, 2006

(54) METHOD AND APPARATUS FOR PERFORMING A SET UP OPERATION FOR A VIDEO SYSTEM

(75) Inventor: Bret David Hawkins, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 612 days.

(21) Appl. No.: 10/163,182

(22) Filed: Jun. 5, 2002

(65) Prior Publication Data

US 2003/0227486 A1  Dec. 11, 2003

(51) Int. Cl.
G06F 13/00 (2006.01)

(52) U.S. Cl. .................... 715/722; 715/735

(58) Field of Classification Search ............... 715/763, 715/764, 716, 722, 735, 779; 348/734, 134
See application file for complete search history.

(56) References Cited

U.S. PATENT DOCUMENTS

| | | | |
|---|---|---|---|
| 6,064,385 A | 5/2000 | Sturgeon et al. | |
| 6,208,384 B1 | 3/2001 | Schultheiss | |
| 6,300,980 B1 | 10/2001 | McGraw et al. | |
| 6,437,836 B1 * | 8/2002 | Huang et al. | 348/734 |
| 6,553,345 B1 * | 4/2003 | Kuhn et al. | 704/275 |
| 2001/0038392 A1 | 11/2001 | Humpleman et al. | |

FOREIGN PATENT DOCUMENTS

| | | |
|---|---|---|
| EP | 1030517 | 8/2000 |
| EP | 1197794 | 4/2002 |
| WO | WO 01/82596 | 11/2001 |

* cited by examiner

Primary Examiner—Cao (Kevin) Nguyen

(74) Attorney, Agent, or Firm—Joseph S. Tripoli; Joseph J. Laks; Reitseng Lin

(57) ABSTRACT

A setup process for a video system enables various operational settings of the video system to be selected and input to the video system using a personal computer. According to an exemplary embodiment, a video system, comprises an interface operatively coupled to a remote computing device through a data communications network for transmitting and receiving setup data representing at least one user selected operational setting of the video system, and a memory operative to store the received setup data.

12 Claims, 5 Drawing Sheets

METHOD AND APPARATUS FOR PERFORMING A SET UP OPERATION FOR A VIDEO SYSTEM

The present invention generally relates to video systems, and more particularly, to a method and an apparatus for allowing a user to setup a video system wherein various operational settings of the video system may be selected and input to the video system using a remote computing device coupled to the video system through a data communications network.

As the complexity of technology advances, the complexity of consumer electronics products tends to likewise increase. This increased complexity is advantageous in that it can provide users with improved product features and functionality, but can also be disadvantageous in that the addition of such features may render products more difficult for users to learn and operate. While many products are designed to be as "user friendly" as possible, some users can become confused, or even frustrated, when confronted with the vast number of features and options provided by today's products.

One process that can be particularly confounding for users is the setup process for a video system, such as a television signal receiver. In particular, this setup process tends to be time consuming and requires users to input various selections to control many aspects of the video system. For example, modern television signal receivers may require users to input information regarding matters such as parental controls, picture quality, audio quality, channel labels, user profiles, channel lists, etc.

Currently, users are typically required to perform such a setup process using a hand-held remote control device in conjunction with on-screen menus. In this manner, the user must navigate through various on-screen menus by operating the designated keys on the hand-held remote control device. Different keys can be used to make selections displayed, or a highlight controlled by directional keys, can be used to make various selections. Given the inherent limitations of a hand-held remote control device as an input terminal, the setup process for a video system can be unduly time consuming and inconvenient for a user. The limitations may include, for example, confusion on the part of the user when the functionality of each key changes for each menu, the limited ability to easily move a highlight using directional keys, the user being forced to make multiple keypresses to make a particular selection, and difficulty making alphanumeric entries at designated portions of the display. Accordingly, there is a need for a technique that renders the setup process for a video system less time consuming and more convenient for a user. The present invention addresses these and other issues.

In accordance with an aspect of the present invention, a method of performing a setup of a video system is disclosed. The method comprises the steps of receiving from a remote computing device, such as a PC, through a data communications network, setup data representing at least one user selected operational setting of the video system, adjusting an associated operational setting of the video system in response to the received set up data, and storing the received setup data within a memory of the video system. In one embodiment, the data communications network is an IEEE 1394 compliant network.

In accordance with another aspect of the present invention, a video system having a setup process is disclosed. The video system comprises means for receiving from a remote computing device, through a data communications network, setup data representing at least one user selected operational setting of the video system, and means for storing the received setup data, wherein the received set up data is used to adjust an associated operational setting of the video system. In an embodiment, the data communications network is an IEEE 1394 compliant network.

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

Figure 1:
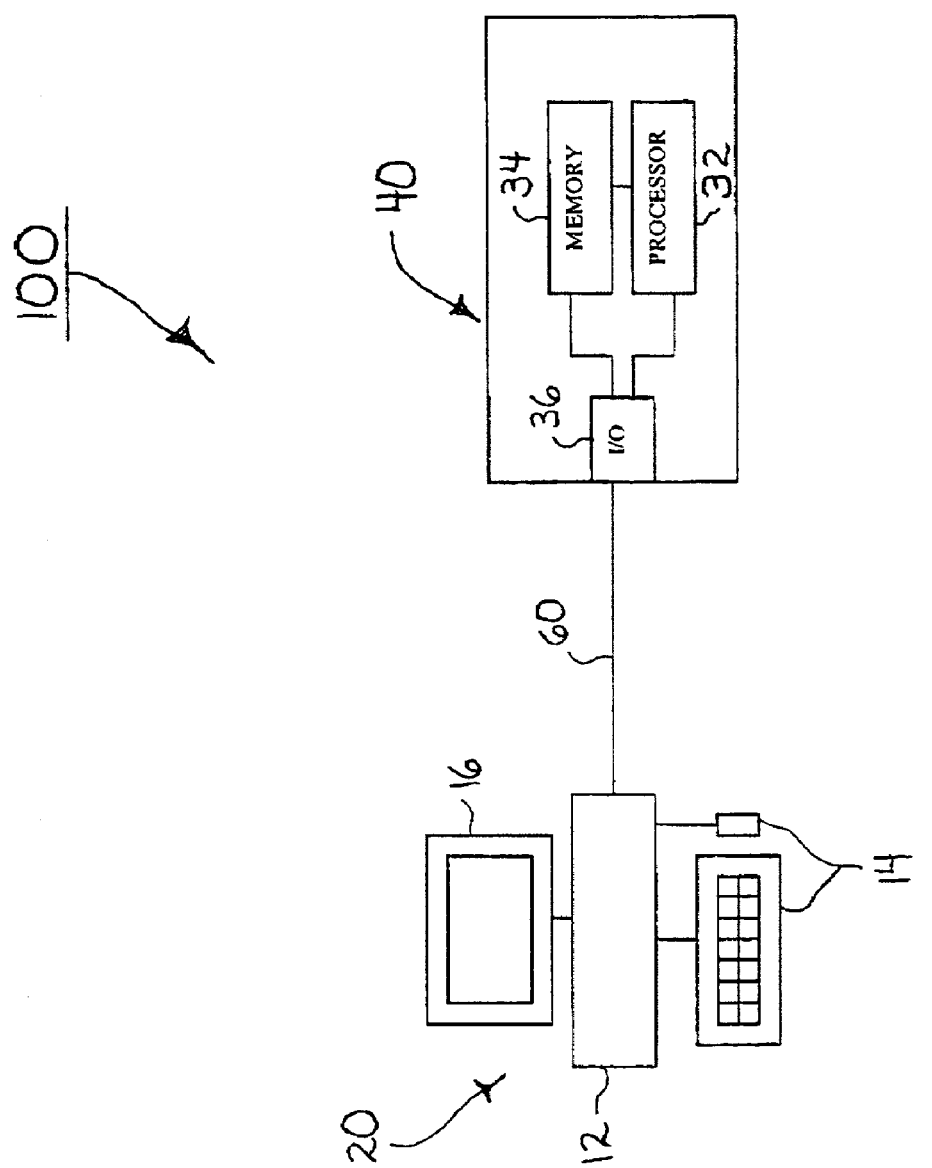
FIG. 1 is an exemplary environment suitable for implementing the present invention.

Referring now to the drawings, and more particularly to FIG. 1, an exemplary environment 100 suitable for implementing the present invention is shown. Suitable elements that may be adapted to perform the functions of the components shown in FIG. 1 are well known in the art. As shown in FIG. 1, environment 100 comprises a personal computer 20, a video system 40, and a communication medium 60. Environment 100 may, for example, represent a portion of a digital home network ("DHN") where various devices in a home can communicate with, and control one another. Accordingly, environment 100 may also include other devices (not shown) that are operatively coupled to personal computer 20 and/or video system 40.

Personal computer 20 comprises a processing unit 12, one or more input devices 14, and a display device 16, and may be embodied as a commercially available desktop or laptop computer. Processing unit 12 comprises various conventional computer elements (not shown) such as a motherboard, a processor, memory, an input/output interface, wires, etc., and is operative to perform functions including, but not limited to, executing program code, storing data, processing data inputs, outputting data, and communicating with other devices on the network using established communications protocols. Input device 14 is operatively coupled to processing unit 12, and may comprise a keyboard, mouse, trackball and/or other input device through which a user may provide inputs to processing unit 12. Display device 16 is operatively coupled to processing unit 12, and may be embodied as a computer monitor or other display device capable of providing variable visual displays based on data outputs from processing unit 12.

Video system 40 comprises a processor 32, a memory 34, and an input/output ("I/O") interface 36, and may be embodied, for example, as a television signal receiver, a set-top box, a video cassette recorder ("VCR"), a digital versatile disk ("DVD") player, a video game box, a personal video recorder ("PVR") or any other video system having a setup process wherein a user inputs setup information regarding operational aspects (e.g., picture quality, channel labels, parental controls, channel lists, etc.) of the system. For clarity of description, only a relevant portion of video system 40 necessary for carrying out the present invention is shown in FIG. 1. Accordingly, various other elements of video system 40 are not shown in FIG. 1. Of course, it is to be understood that video system 40 includes, or may be coupled to, a display device that is suitable for displaying the various on screen menus generated under the control of processor 32.

Processor 32 controls various operations of video system 40, and is operative to perform functions including, but not limited to, executing program code, controlling data storage, and controlling the input and output of data to and from video system 40. Memory 34 is operatively coupled to processor 32, and may be embodied as one or more memory circuits comprising volatile and/or non-volatile memories such as an electrically-erasable, programmable, read-only memory ("EEPROM"), flash memory, and/or other data storage device. Memory 34 is operative to store data, such as executable program code, setup data for video system 40, data outputs from processor 32, and/or other data. I/O interface 36 is operatively coupled to processor 32, memory 34, and communication medium 60 and may be embodied as an IEEE-1394 interface, an RS-232 interface, a USB interface, or other type of interface. I/O interface 36 is operative to enable the exchange of data between video system 40 and other devices, such as personal computer 20.

Communication medium 60 operatively couples and transmits data between personal computer 20 and video system 40. Communication medium 60 may be embodied as a digital bus, such as an IEEE-1394 bus having asynchronous and isochronous operational characteristics, although other types of communication mediums may be utilized. For example, video system 40 and computing system 20 may also be connected to each other and exchange data, through a suitable wireless interface, such as 802.11b, bluetooth, etc, which allows the exchange of on screen menu information and subsequent user selection in response to the on screen menu.

In implementing the goals of the invention, data for generating on screen menus, as well as the current settings if desired, are transmitted from video system 40 to personal computer 20 through the data network medium 60. The data for the on screen menus may be transmitted upon request from a user operating personal computer 20. In such a system, the user is able to use the display and input devices, such as a keyboard, a mouse, or a rollerball, associated with personal computer 20 to easily, quickly and conveniently move the selector highlight, or icon, over the on screen menu and make the desired selection or alphanumeric entry. The user selections are also transmitted through communications medium 60 to video system 40 where they are stored and used to adjust the operational settings of video system 40.

Alternatively, a set of on screen menus associated with the set up process may be transmitted in batch upon initial connection of video system 40 with person computer 20, and upon the determination that personal computer 20 does not have such on screen menu and setting data stored therein, or upon determination that the selection data stored in personal computer 20 differs from the selection data stored in video system 40. The on screen menu displayed on personal computer 20 are preferably the same in order and design as those displayed on a display device associated with video system 40 to reduce the potential for use confusion. Alternatively, the on screen menus may be adjusted to take advantage of the generally higher display capabilities of the personal computer 20, for example, by displaying multiple menus on a single display, or by including additional explanatory material within the menus. The data for generating the on screen menus and the data representative of the current settings is transmitted through the communications medium 60 using one of a plurality of established communications standards.

Figure 2:
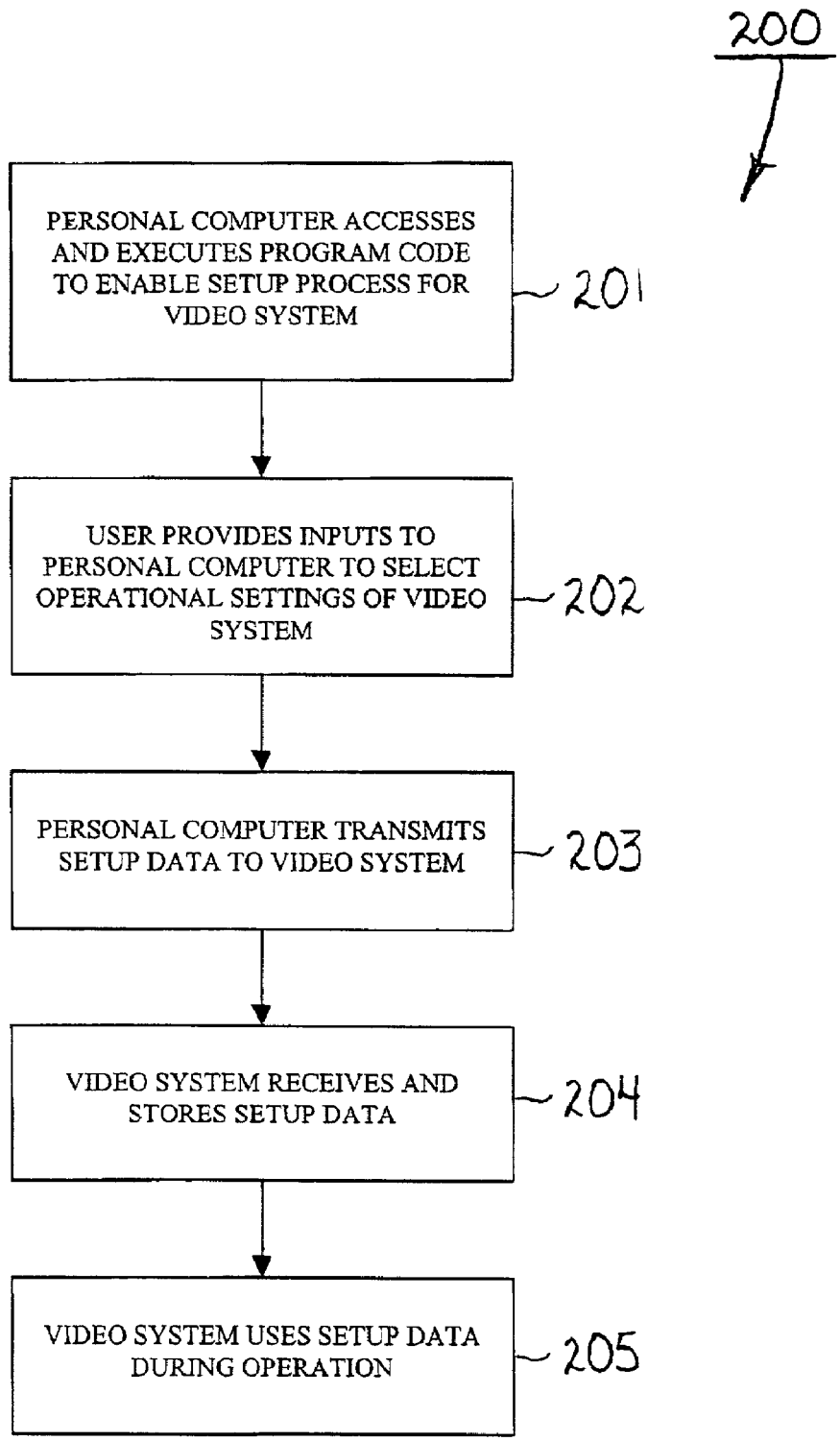
FIG. 2 is a flowchart illustrating exemplary steps for carrying out the present invention.

Referring now to FIG. 2, a flowchart 200 illustrating exemplary steps for carrying out the present invention is shown. For purposes of example and explanation, the steps of FIG. 2 will be described with reference to environment 100 of FIG. 1. Accordingly, the steps of FIG. 2 are merely exemplary, and are not intended to limit the present invention in any manner.

At step 201, a user of personal computer 20 provides an input via input device 14 causing personal computer 20 to access and begin execution of program code that enables a setup process for video system 40. According to an exemplary embodiment, the program code and data representative of the on screen menus and current settings are stored within processing unit 12 of personal computer 20, and is directly accessed and executed by processing unit 12 in response to the user input. According to another exemplary embodiment, the program code and data representative of the on screen menus and current settings are stored within memory 34 of video system 40. In this embodiment, the user input to personal computer 20 at step 201 also causes the program code and data representative of the on screen menus and current settings to be downloaded to processing unit 12 via communication medium 60 prior to execution. In particular, the user input causes processing unit 12 to transmit a command to video system 40 via communication medium 60 requesting that the program code and data representative of the on screen menus and current settings be downloaded to processing unit 12. Execution of the program code by processing unit 12 causes various on-screen menus to be generated on display device 16 through which the user may select various operational settings of video system 40.

At step 202, the user of personal computer 20 provides inputs via input device 14 responsive to the on-screen menus on display device 16 to select various operational settings, or to enter required alphanumeric data, to control the operation of video system 40. According to an exemplary embodiment, the on-screen menus are sequentially presented to the user such that once the user selects one or more operational settings associated with one menu, a next menu is presented. The menus may also be hierarchical such that a given menu includes one or more sub-menus. It is also preferred that the user be able to selectively navigate back and forth among the various menus and corresponding sub-menus, as desired. Preferably the menus are presented in the same order and with the same design as the menus presented on a video display device associated with the video system 40. Examples of such on-screen menus are shown in FIGS. 3 through 5.

Figure 3:
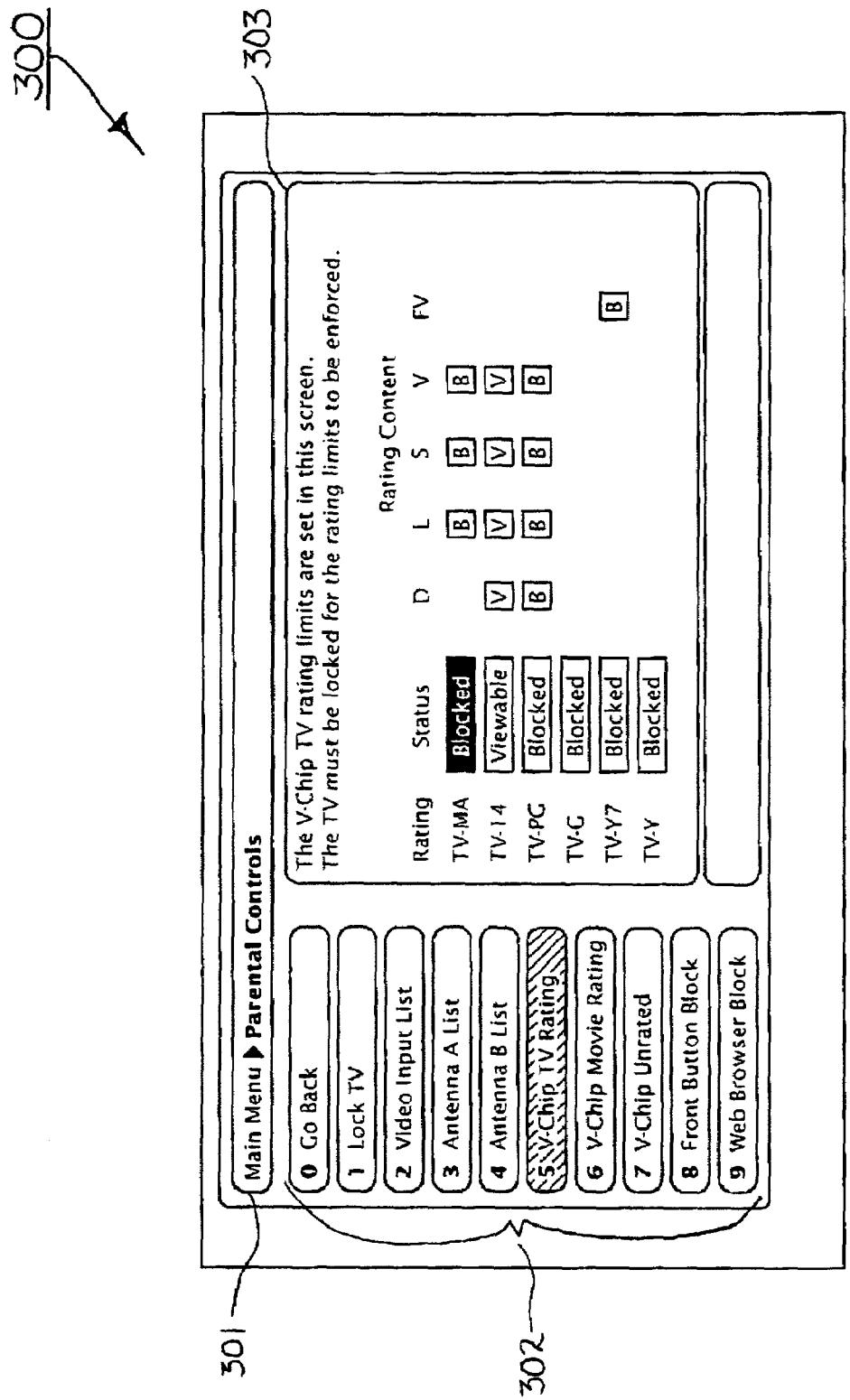
FIG. 3 is a first exemplary on-screen menu suitable for use in carrying out the present invention.

FIG. 3 illustrates a first exemplary on-screen menu 300 suitable for use in carrying out the present invention. In particular, on-screen menu 300 enables a user of personal computer 20 to select various parental control settings for video system 40. As shown in FIG. 3, on-screen menu 300 includes a title portion 301, a sub-menu portion 302, and a setting selection portion 303. Title portion 301 indicates the title of menu 300, which is "Parental Controls." As indicated in FIG. 3, the "Parental Controls" menu 300 may be a sub-menu of a menu entitled "Main Menu," and may be selected by a user of personal computer 20 via input device 14.

Sub-menu portion 302 lists various sub-menus available for user selection within menu 300. In particular, a user of personal computer 20 may select via input device 14 a given sub-menu within sub-menu portion 302 in order to access one or more settings associated with that given sub-menu. In FIG. 3, for example, the sub-menu entitled "V-Chip TV Rating" is shown as having been selected. When a sub-menu within sub-menu portion 302 is selected, setting selection portion 303 displays one or more settings associated with the selected sub-menu. As indicated in FIG. 3, setting selection portion 303 provides various parental control settings for video system 40 that may be selected by a user of personal computer 20. For example, setting selection portion 303 allows a user of personal computer 20 to select whether programs of certain rating levels are viewable, or to be blocked from viewing by video system 40. Various fields may be conveniently selected by using an arrow icon whose movement can be controlled using a mouse, a trackball, a touchpad, or other similar devices. It can be seen that the present invention allows a user to easily and quickly make multiple selections and entries in enabling, or setting, features that otherwise would require multiple keypresses on a remote control device.

Figure 4:
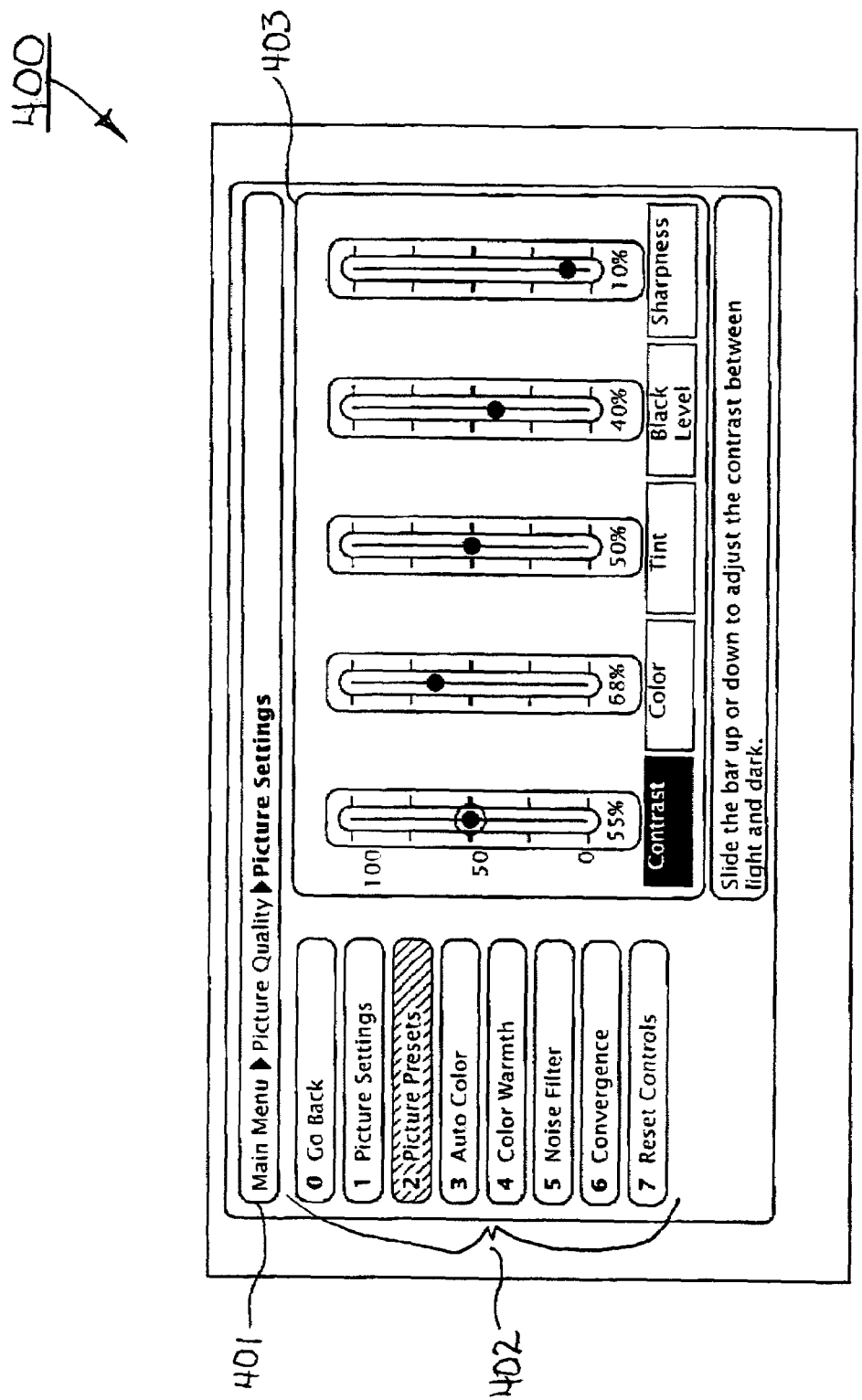
FIG. 4 is a second exemplary on-screen menu suitable for use in carrying out the present invention.
Figure 5:
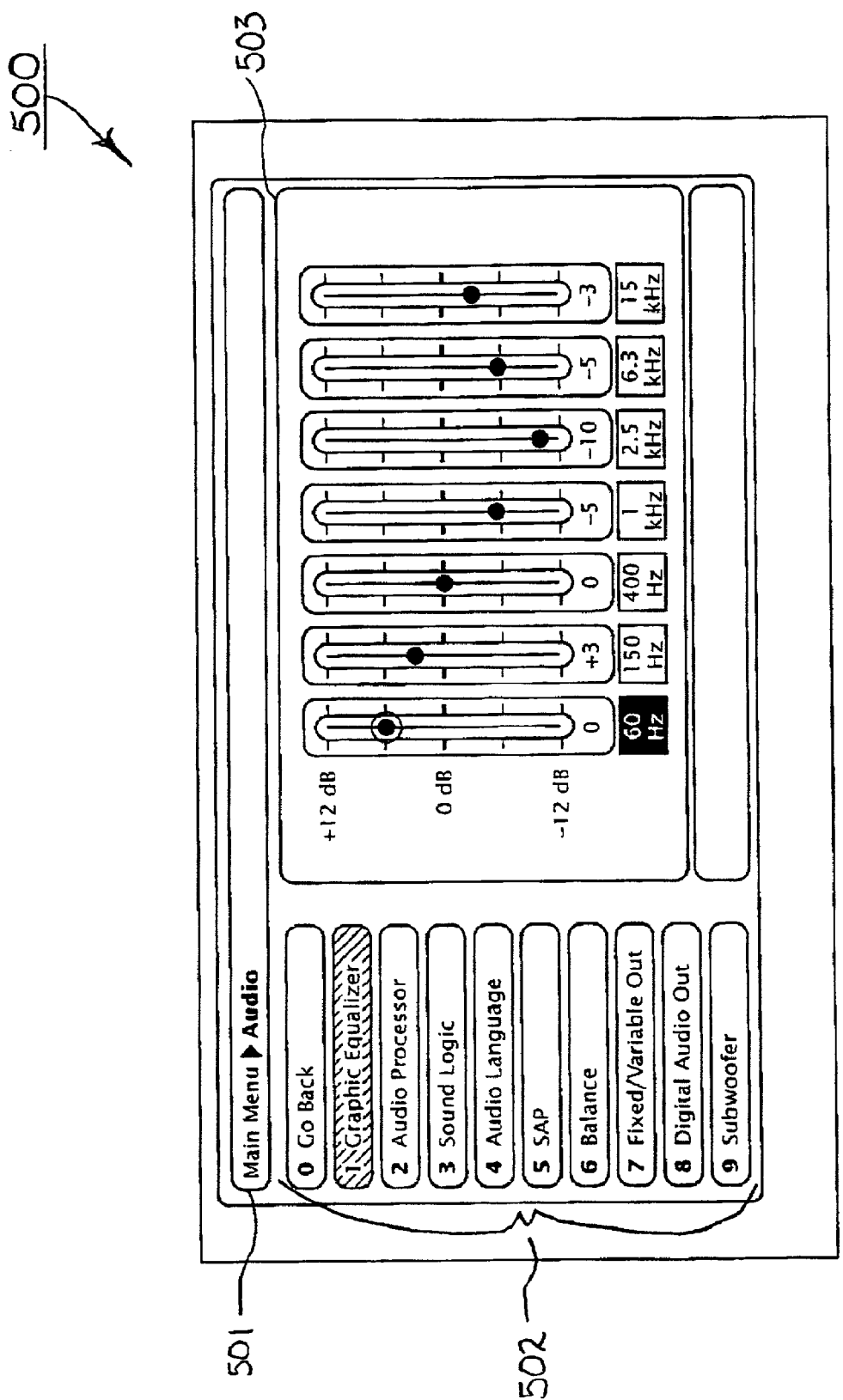
FIG. 5 is a third exemplary on-screen menu suitable for use in carrying out the present invention.

FIG. 4 illustrates a second exemplary on-screen menu 400 suitable for use in carrying out the present invention. In particular, on-screen menu 400 enables a user of personal computer 20 to select various picture quality settings for video system 40. Like on-screen menu 300 of FIG. 3, on-screen menu 400 also includes a title portion 401, a sub-menu portion 402, and a setting selection portion 403. Title portion 401 indicates the title of menu 400, which is "Picture Settings." As indicated in FIG. 4, the "Picture Settings" menu 400 may be a sub-menu of a menu entitled "Picture Quality," which in turn is a sub-menu of a menu entitled "Main Menu." In this manner, a user of personal computer 20 may navigate through various hierarchically arranged menus via input device 14 to select a desired menu.

Sub-menu portion 402 lists various sub-menus available for user selection within menu 400. In particular, a user of personal computer 20 may select via input device 14 a given sub-menu within sub-menu portion 402 in order to access one or more settings associated with that given sub-menu. In FIG. 4, for example, the sub-menu entitled "Picture Presets" is shown as having been selected. When a sub-menu within sub-menu portion 402 is selected, setting selection portion 403 displays one or more settings associated with the selected sub-menu. As indicated in FIG. 4, setting selection portion 403 provides various picture settings (i.e., contrast, color, tint, black level, sharpness settings) for video system 40 that may be selected by a user of personal computer 20. For example, setting selection portion 403 allows a user of personal computer 20 to manipulate via input device 14 various slider bars in order to select various picture quality settings for video system 40.

FIG. 5 illustrates a third exemplary on-screen menu 500 suitable for use in carrying out the present invention. In particular, on-screen menu 500 enables a user of personal computer 20 to select various audio quality settings for video system 40. Like on-screen menus 300 and 400 of FIGS. 3 and 4, on-screen menu 500 also includes a title portion 501, a sub-menu portion 502, and a setting selection portion 503. Title portion 501 indicates the title of menu 500, which is "Audio." As indicated in FIG. 5, the "Audio" menu 500 may be a sub-menu of a menu entitled "Main Menu," and may be selected by a user of personal computer 20 via input device 14.

Sub-menu portion 502 lists various sub-menus available for user selection within menu 500. In particular, a user of personal computer 20 may select via input device 14 a given sub-menu within sub-menu portion 502 in order to access one or more settings associated with that given sub-menu. In FIG. 5, for example, the sub-menu entitled "Graphic Equalizer" is shown as having been selected. When a sub-menu within sub-menu portion 502 is selected, setting selection portion 503 displays one or more settings associated with the selected sub-menu. As indicated in FIG. 5, setting selection portion 503 provides various audio settings (i.e., frequency response settings) for video system 40 that may be selected by a user of personal computer 20. For example, setting selection portion 503 allows a user of personal computer 20 to manipulate via input device 14 various slider bars in order to select various audio quality settings for video system 40. Other types of on-screen menus than those shown in FIGS. 3 through 5 may also be utilized in accordance with the present invention.

Referring back to FIG. 2, as the user provides inputs to select operational settings of video system 40 at step 202, processing unit 12 of personal computer 20 generates and stores (at least temporarily) setup data in response to the inputs. Accordingly, the stored setup data is representative of at least one user selected operational setting of video system 40.

Next, at step 203, processing unit 12 of personal computer 20 transmits the stored setup data to video system 40, which is connected to personal computer 20 through a data communications network via communication medium 60. According to an exemplary embodiment, transmission of the stored setup data at step 203 may be performed in response to a user input to personal computer 20 or video system 40. For example, a user may provide an input to personal computer 20 or video system 40 causing all of the stored setup data, or only a portion thereof, to be transmitted to video system 40 via communication medium 60.

According to another exemplary embodiment, transmission of the stored setup data at step 203 may be performed automatically by processing unit 12 of personal computer 20 following one or more of the user inputs at step 202. For example, processing unit 12 may automatically cause the stored setup data to be transmitted to video system 40 through the data communications network on a rolling basis as the user provides inputs at step 202. In this manner, individual elements of setup data are transmitted to video system 40 in an on-going fashion as the user provides inputs at step 202. Alternatively, processing unit 12 may automatically cause all of the stored setup data to be transmitted to video system 40 only after the user has navigated through all of the available on-screen menus. Other techniques for transmitting setup data from personal computer 20 to video system 40 at step 203 may also be utilized in accordance with the present invention.

At step 204, video system 40 receives the setup data from personal computer 20 via communication medium 60, and stores the received setup data in memory 34. As previously indicated herein, the received setup data represents at least one user selected operational setting of video system 40. According to an exemplary embodiment, processor 32 of video system 40 detects reception of the setup data at step 204 via I/O interface 36, and causes the received setup data to be stored in a non-volatile portion of memory 34. In this manner, the stored setup data is maintained in memory 34 even if a supply of electrical power is removed from video system 40.

To detect reception of the setup data at step 204, processor 32 performs a data identification operation such that the setup data may be distinguished from other types of data. This data identification operation may be performed in a variety of different ways. According to an exemplary embodiment, the setup data received at step 204 comprises one or more packets of digital data each including a packet header or other identifier that identifies the data by its type. For example, each packet of the received setup data may include a packet header having a predetermined bit sequence that identifies the data as setup data for video system 40.

According to another exemplary embodiment, the setup data received at step 204 comprises one or more packets of digital data each including a packet header or other identifier that identifies the data by its source of origination. For example, each packet of the received setup data may include a packet header having a predetermined bit sequence indicating that the data originated from personal computer 20. With this embodiment, processor 32 may for example identify all data having personal computer 20 as its source of origination as setup data for video system 40. Other techniques for detecting and/or identifying the setup data at step 204 may also be utilized in accordance with the present invention.

Then, at step 205, video system 40 uses the stored setup data during its operation. According to an exemplary embodiment, during operation of video system 40, processor 32 enables the stored setup data to be retrieved from memory 34 as necessary, and utilized by applicable elements of video system 40. For example, in the case that video system 40 is embodied as a television signal receiver, stored setup data representative of parental control settings may be retrieved from memory 34 and utilized by audio/video blanking circuitry (not shown in FIG. 1) of video system 40. Such circuitry may, for example, utilize the setup data to determine whether a particular television program exceeds the established parental control settings, and therefore should be blocked from viewing. Other uses of the stored setup data may also be provided in accordance with the present invention.

As described herein, the present invention provides a setup process for a video system wherein various operational settings of the video system may be selected and input to the video system using a personal computer. Accordingly, the setup process for a video system is less time consuming and more convenient for a user. The present invention described herein is particularly applicable to various video systems, either with or without display device. Accordingly, the phrase "video system" as used herein is intended to encompass various types of systems or apparatuses including, but not limited to, television sets or monitors that include a display device, and systems or apparatuses such as a set-top box, VCR, DVD player, video game box, PVR or other video system that may not include a display device. Furthermore, the phrase "personal computer" or "personal computing system" is intended to encompass any computing device that includes a processing unit, a memory, and input/output devices, and which is capable of executing the necessary code and accepting user input and transmitting the user input over a data communications network, for example, a PDA, or a tablet PC.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for performing a setup of a video system to select the operational settings associated with the video system, comprising the steps of:
   providing an on-screen display for allowing a user to select an operational setting;
   if a remote computing device has not stored the on-screen display, transmitting the on-screen display to the remote computing device through a data communications network in response to a user request entered at the remote computing device;
   receiving setup data from the remote computing device through the data communications network in response to user entries on the remote computing device in response to the on-screen display;
   adjusting an associated operational setting in the video system in response to the received setup data; and
   storing the received setup data within a memory of the video system.

2. The method according to claim 1, wherein the data communications network is an IEEE 1394 compliant network.

3. The method according to claim 2, wherein the providing step comprises providing on-screen displays that are substantially identical to displays that are provided on the video system in response to user operation of a remote control device whereby the user can select the operation settings on the remote computing device using substantially the same on-screen displays as those provided on the video system.

4. The method according to claim 2, wherein the operational setting comprises a parental control setting, a picture quality setting or an audio quality setting.

5. The method according to claim 1, further comprising the steps of:
   detecting a connection of the remote computing device to the video system through an IEEE 1394 compliant network.

6. The method according to claim 5, wherein the transmitting step comprises transmitting on-screen displays that are substantially identical to displays generated on the video system in response to user operation of a remote control device whereby the user can select the operational settings on the remote computing device using substantially the same on-screen displays as those generated on the video system.

7. The method according to claim 5, wherein the operational setting comprises a parental control setting, a picture quality setting or an audio quality setting.

8. A video system, comprising:
   a non-volatile memory for storing on-screen displays and setup data;
   a signal connector adapted to be coupled to data communications network;
   an interface coupled to the signal connector for transmitting on-screen displays to a remote computing device if the remote computing device has not stored the on-screen displays, and receiving setup data from the remote computing device, the setup data representing at least one user selected operational setting of the video system; and
   a control unit coupled to the interface and the non-volatile memory, the control unit controlling an operating condition of the video system in response to setup data received from the remote computing device through the data communications network.

9. The video system (40) of claim 8, wherein the control unit transmits the on-screen displays to the remote computing device via the data communications network in response to a user request entered at the remote computing device, the on-screen displays being substantially identical to the on-screen displays generated on a display associated with the video system in response to user operation of a remote control device.

10. The video system of claim 8, wherein the control unit determines, upon initial connection of the remote computing device to the video system, whether the remote computing system has stored therein on-screen displays for allowing a user to select operational settings of the video system.

11. The video system of claim 8, wherein the operational setting comprises one of parental controls, picture quality controls, and audio quality controls.

12. The video system of claim 8, wherein setup data is received from the remote computing device through an IEEE-1394 compliant network.

* * * * *